Oct. 16, 1951      P. BREKKE      2,571,530

TOOLHOLDER AND TOOLHOLDER BLOCK COMBINATION

Filed July 16, 1949

INVENTOR
PETER BREKKE
BY
ATTORNEY

Patented Oct. 16, 1951

2,571,530

UNITED STATES PATENT OFFICE 2,571,530

TOOLHOLDER AND TOOLHOLDER BLOCK COMBINATION

Peter Brekke, Los Angeles, Calif.

Application July 16, 1949, Serial No. 105,188

6 Claims. (Cl. 82—36)

This invention relates to improvements in a tool holder and tool holder block combination and more particularly, to a cutting tool holder and block of the general type adapted for use on lathes and screw machines for supporting a cutting tool, such a machine being provided with a rotary work holding spindle assembly capable of being driven in either direction, and also being provided with a support or rest arranged for supporting and for moving the tool holder and block combination for presenting the cutting tool to the work being rotated.

One object of the invention is to provide a tool holder and block combination which permits quick changes of the tool holder and tool close to the work without disturbing the setup or without the necessity of moving the tool rest of the lathe. Another object is to provide a tool holder and block combination in which the tool holder with the tool may be removed vertically from the block.

These and other objects are attained by my invention which will be understood from the following description, reference being made to the accompanying drawing which forms a part hereof, in which.

Figure 1:
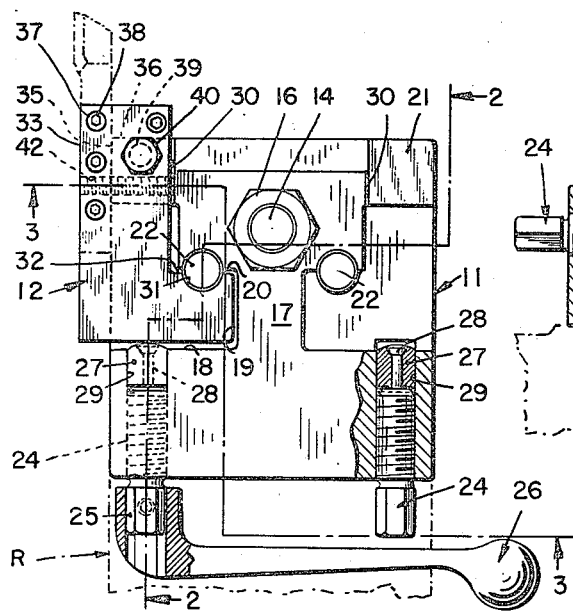
Figure 1 is a plan view of a tool holder and tool holder block combination.
Figure 2:
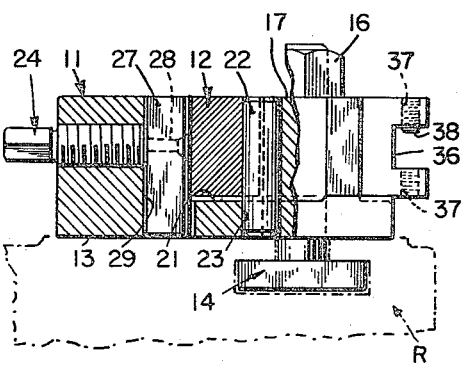
Figure 2 is a cross-sectional view taken on the line 2—2 of Figure 1.
Figure 4:
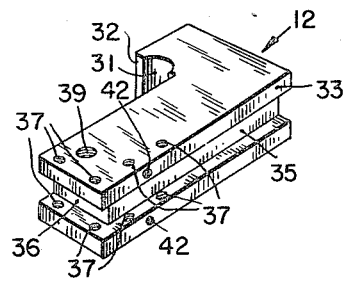
Figure 4 is a perspective view of the tool holder.
Figure 3:
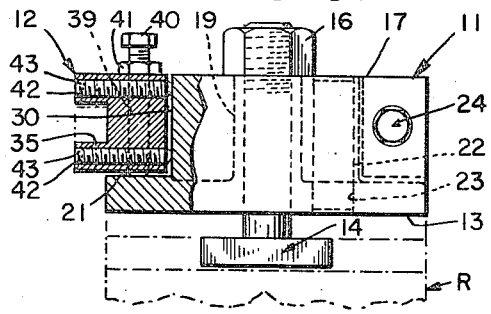
Figure 3 is a cross-sectional view taken on the line 3—3 of Figure 1.

Referring to the drawings, my invention consists generally of a tool holder block 11 which is adapted to removably and adjustably hold the tool holder 12, as will be described. The tool holder block may be arranged to hold a single tool holder or it may be double and adapted to hold both right and left tool holders. In the latter case, the tool holder block is recessed for left and right tool holders, as shown particularly in Figure 1. The tool holder block 11 consists of a rectangular metal block, usually of steel, whose bottom surface 13 is horizontally disposed and adapted to be supported on the compound rest R of the lathe. A T-bolt 14 is provided for attachment in the T-slot of the rest, a nut 16 on the upper end above the block securing the block to the lathe rest. The block is provided with a recumbent L-shaped tool holder recess extending downwardly from the top surface 17 at one edge of the block with the foot portion of the L-shaped recess terminating interiorly of said block, defined by the vertical walls 18, 19, and 20. The bottom surface 21 of the recess is a plane horizontal surface upon which the tool holder 21 rests. In the vertical wall 20 (which is the upper surface of the foot of the L), there is provided a fulcrum pin 22 which extends from the bottom surface 21 of the recess to the top surface 17 of the block 11. The fulcrum pin 22 is disposed in a vertical position, and arranged so that approximately half of the cylinder protrudes into the recess space, this pin being preferably of hardened steel mounted in the fulcrum pin hole 23 which is provided in the block beneath the bottom surface 21 of the recess, the pin being rigidly fixed as by brazing or welding, or it may be integral with the block. In the wall 18 of the recess, opposite the fulcrum pin 22, there is provided a horizontal set screw 24 which terminates on the back edge or operator side of the block in a hexagonal head 25 which may be turned by means of the removable handle 26. The opposite end of the set screw 24 is swivelly attached to the clamp block 27 by means of the countersunk screw 28, the clamping surface of the clamp block 27 being aligned generally with the vertical wall 18 of the recess, and the clamp block groove 29 being provided in the wall 18 for said clamp block.

The tool holder 12 consists of an L-shaped block slightly smaller than, but adapted to generally fit in the L-shaped recess of the block 11 as defined by the vertical walls 18, 19, 20 and 30 and the bottom surface 21. A half cylindrical groove 31 is provided on the inside vertical wall 32 (corresponding to the upper face of the foot of the L) which groove 31 is adapted to fit and engage the fulcrum pin 22 in the half cylindrical portion exposed in the recess of the block. The outer side face 33 of the tool holder and the outer end face of the tool holder are provided with horizontally disposed tool shank grooves 35 and 36, respectively, threaded set screw holes 37 being provided adjacent these grooves for set screws 38 which are adapted to securely hold the shank of the tool. The tool holder 12 is provided with a threaded vertical hole 39 for a horizontal abutting screw 40 by which the vertical position of the tool holder relative to the bottom of the recess is adjustably fixed, a lock nut 41 being conveniently provided on the screw 40. The block is also provided with horizontally disposed threaded holes 42 disposed in the outer side face 33 of the tool holder in which headless set screws 43 are threaded, the ends of said screws abutting the wall 30 of the recess to position the tool holder angularly in its pivotal movement on the fulcrum pin 22. Flame hardened surfaces are preferably provided on the block faces where the adjusting screws abut.

Where right and left recesses are provided in the block 11 for the separate or alternate reception of tool holders, right and left tool holders are provided. The tool holders are conveniently made for the top to bottom reversal, being provided with set screw holes extending from both the top and bottom surfaces so that if desired, a left handed tool holder may be inverted for use as a right handed tool holder in the right handed recess, the set screws being removed from top to bottom to correspond.

Figure 5:
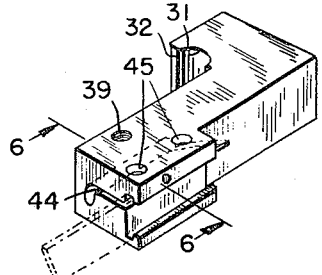
Figure 5 is a perspective view of a modified form of the tool holder.
Figure 6:
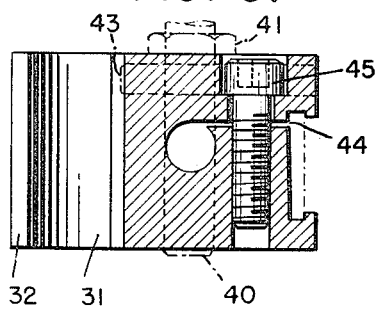
Figure 6 is a cross-sectional view taken on the line 6—6 of Figure 5.

An alternative form of tool holder is shown in Figures 5 and 6, in which a split clamp arrangement is used for holding the tool, a clamp slot 44 being provided horizontally in the block through the tool mounting groove with clamping screws 45 being provided for closing the clamp slot. This alternative form of tool holder is particularly useful for holding cutting off tools having relatively thin blades or shanks.

The advantages of my improved tool holder block and tool holder combination will be apparent from the above description. The several tools may be mounted in identical tool holders and may be quickly removed and replaced in the tool holder block without the necessity of moving the block longitudinally or crosswise, or of otherwise changing its position. The tool holders may be removed vertically without striking the work and at the same time are adjustable for small changes of cutting position by the rocking of the tool holder on the fulcrum pin. The use of a reversible block having right and left tool holder recesses permits the use of the combination alternately for right or left traverse without requiring a re-setting of the tools.

I claim:

1. A tool holder and tool holder block combination for use on a lathe or the like, comprising a tool holder block having means for adjustable attachment to a lathe or the like, said block having a recumbent L-shaped tool holder recess extending downwardly from the top surface of said block at one edge thereof with the foot portion of the L terminating interiorly of said block, said block having a fulcrum pin mounted vertically in the bottom of said recess; means projectable from the vertical wall of said recess opposite said fulcrum pin adapted for clamping a tool holder therebetween; and an L-shaped tool holder having an aperture adapted to rockably fit over said fulcrum pin in said L-shaped recess in said block.

2. A tool holder and tool holder block combination for use on a lathe or the like, comprising a tool holder block having means for adjustable attachment thereon to a lathe or the like, said block having right and left recumbent L-shaped tool holder recesses extending downwardly from the top surface of said block at opposite edges thereof with the foot portions of the L terminating interiorly of said block, said block having a fulcrum pin mounted vertically in the bottom of each of said recesses; means projectable from the vertical wall of said recess opposite each of said fulcrum pins adapted for separately clamping each of said tool holders in said block; and right and left L-shaped tool holders adapted to rockably fit respectively over said fulcrum pin in each of said L-shaped recesses in said block.

3. A tool holder and tool holder block combination for use on a lathe or the like, comprising a tool holder block having means for adjustable attachment to a lathe or the like, said block having a recumbent L-shaped tool holder recess extending downwardly from the top surface of said block at one edge thereof with the foot portion of the L terminating interiorly of said block, said block having a half cylindrical fulcrum pin extending laterally from the vertical wall of said recess constituting the top of the foot of said L with means projectable from the vertical wall of said recess opposite said fulcrum pin adapted for clamping a tool holder therebetween; and an L-shaped tool holder having a groove adapted to rockably fit over said fulcrum pin in said L-shaped recess in said block, said tool holder being provided in its outside edges with means for holding the tool shanks.

4. A tool holder and tool holder block combination for use on a lathe or the like, comprising a tool holder block having a plane bottom surface and means for adjustable attachment thereon to a T-slot in a tool rest, said block having a recumbent L-shaped tool holder recess extending downwardly from the top surface of said block at one edge thereof with the foot portion of the L terminating interiorly of said block, the bottom surface of said tool holder recess being parallel to the bottom of said block, said block having a fulcrum pin mounted vertically thereon, said pin extending laterally as a half cylinder from the vertical wall of said recess constituting the top of the foot of said L, with means projectable from the vertical wall of said recess opposite said fulcrum pin adapted for clamping a tool holder therebetween; an L-shaped tool holder having a groove adapted to rockably fit over said fulcrum pin in said L-shaped recess in said block, horizontally disposed tool holding grooves in the outside edges of said tool holder including set screw means for holding the tool shanks; means for adjusting the vertical position of the tool holder in said block; and means for adjusting the angular position of said holder relative to the axis of said fulcrum pin in said block.

5. A tool holder and tool holder block combination for use on a lathe or the like, comprising a tool holder block having a plane bottom surface and means for adjustable attachment thereon to a T-slot in a tool rest, said block having a recumbent L-shaped tool holder recess extending downwardly from the top surface of said block at one edge thereof with the foot portion of the L terminating interiorly of said block, the bottom surface of said tool holder recess being parallel to the bottom of said block, said block having a fulcrum pin mounted vertically thereon, said pin extending laterally as a half cylinder from the vertical wall of said recess constituting the top of the foot of said L, with set screw means projectable from the vertical wall of said recess opposite said pin adapted for clamping a tool holder therebetween; a tool holder having a half-cylindrical groove on one edge adapted to rockably fit over said fulcrum pin in said L-shaped recess in said block, horizontally disposed tool holding grooves in the outside edges of said tool holder including set screw means for holding the tool shanks; adjustable screw means threadedly mounted vertically in said tool holder and abutting the bottom surface of the recess of said block for adjusting the vertical position of the tool holder in said block; and horizontal rocking adjustment screws threadedly mounted in said tool holder and abutting the vertical face of the recess in said block for adjusting the angular position of said holder relative to the axis of said fulcrum pin of said block.

6. A tool holder and tool holder block combination for use on a lathe or the like, comprising a tool holder block having a plane bottom surface and means for adjustable attachment thereon to a T-slot in a tool rest, said block having right and left recumbent L-shaped tool holder recesses extending downwardly from the top surface of said block at opposite edges thereof with the foot portions of the L terminating interiorly of said block, the bottom surface of said tool holder recesses being parallel to the bottom of said block, said block having a fulcrum pin mounted vertically thereon in each recess, said pin extending laterally as a half cylinder from the vertical wall of said recess constituting the top of the foot of said L, with set screw means projectable from the vertical wall of each of said recesses opposite said fulcrum pin adapted for clamping a tool holder therebetween; right and left L-shaped tool holders adapted to rockably fit respectively over said fulcrum pin in each of said L-shaped recesses in said block, horizontally disposed tool holding grooves in the outside edges of each of said tool holders including set screw means for holding the tool shanks; adjustable screw means threadedly mounted vertically in each of said tool holders and abutting the bottom surface of the respective recess of said block for adjusting the vertical positions of the tool holders in said block; and horizontal rocking adjustment screws threadedly mounted in each of said tool holders and abutting the respective vertical faces of the recesses in said block for adjusting the angular position of each of said holders relative to the axis of said respective fulcrum pins of said block.

PETER BREKKE.

REFERENCES CITED

The following references are of record in the file of this patent:

UNITED STATES PATENTS

| Number | Name | Date |
|---|---|---|
| 1,342,031 | Skibinski | June 1, 1920 |
| 2,351,892 | Welbury | June 20, 1944 |
| 2,403,405 | Sirola | July 2, 1946 |
| 2,430,823 | Nielsen | Nov. 11, 1947 |
| 2,472,255 | Kyle | June 7, 1949 |

FOREIGN PATENTS

| Number | Country | Date |
|---|---|---|
| 377,458 | Italy | Dec. 18, 1939 |